United States Patent [19]

Araki

[11] Patent Number: 5,170,107
[45] Date of Patent: Dec. 8, 1992

[54] HEAD LAMP WASHER
[75] Inventor: Toshihiro Araki, Atsugi, Japan
[73] Assignee: Nissan Motor Co., Ltd., Yokohama, Japan
[21] Appl. No.: 799,656
[22] Filed: Nov. 29, 1991
[51] Int. Cl.5 .............................................. B60S 1/08
[52] U.S. Cl. ............................. 318/443; 318/DIG. 2; 307/10.01; 15/250.02
[58] Field of Search ................ 318/443, 444, DIG. 2; 307/9.1, 10.1; 15/250.01, 250.02, 250.12, 250.16, 250.17, 250.27

[56] References Cited

U.S. PATENT DOCUMENTS 3,641,613  2/1972  Povilaitis et al. ................ 15/250.02
5,012,977  5/1991  Karlins et al. .................... 239/284.1
5,073,722  12/1991  Tohge et al. ....................... 307/10.1

FOREIGN PATENT DOCUMENTS 57-133457  8/1982  Japan .
61-200050  9/1986  Japan .

Primary Examiner—Bentsu Ro
Attorney, Agent, or Firm—Lowe, Price, LeBlanc & Becker

[57] ABSTRACT

A head lamp washer is disclosed, which is for use in a motor vehicle having a head lamp and a windshield washer for washing a windshield of the motor vehicle. The head lamp washer comprises a washing liquid spray system for spraying washing liquid over a face of the head lamp. The spray system has both a manual mode in which the spray system operates independently and an automatic mode in which the spray system operates in cooperation with the windshield washer. A manual mode setting switch causes the spray system to assume the manual mode when turned ON and an automatic mode setting switch causes the spray system to assume the automatic mode when turned ON. Under the operation mode, the washing liquid spraying starts when the operations of the windshield washer are counted to a predetermined number. The amount of washing liquid sprayed under the automatic mode is less than that sprayed under the manual mode.

11 Claims, 3 Drawing Sheets

HEAD LAMP WASHER

BACKGROUND OF THE INVENTION

1. Field of the Invention

The present invention relates to washers for automotive head lamps, and more particularly to head lamp washers of a type which, upon requirement, sprays washing liquid upon a face of the head lamp to wash the same.

2. Description of the Prior Art

Hitherto, various head lamp washers of the above-mentioned type have been proposed and put into practical use particularly in the field of wheeled motor vehicles, some of which are shown in Japanese Patent First Provisional Publications Nos. 57-133457 and 61-20050.

In the head lamp washer of the former publication, there are employed both a manual mode setting switch which, when actuated, operates a washing liquid sprayer for a head lamp and an automatic mode setting switch which, when actuated, operates the washing liquid sprayer for the head lamp in cooperation with a washing liquid sprayer for a windshield.

In the head lamp washer of the latter publication, there is employed a means for detecting the energization of the head lamp, so that operation of the liquid sprayer for the head lamp is effected only when the head lamp is energized. In fact, with the head lamp kept energized, the operation of the liquid sprayer for the head lamp is carried out in cooperation with that of a liquid sprayer for a windshield.

However, in the above-mentioned conventional head lamp washers, there has not been employed satisfied measure for saving the washer liquid. In fact, in the head lamp washers disclosed by such publications, the washing liquid for the head lamp is consumed whenever the windshield washer is under operation irrespective of whether washing of the head lamp is really needed or not.

SUMMARY OF THE INVENTION

It is therefore an object of the present invention to provide a head lamp washer which is free of the above-mentioned drawback.

According to the present invention, there is provided an improved head lamp washer which can save the washing liquid for the head lamp while carrying out a cooperative operation with a windshield washer.

According to one aspect of the present invention, there is provided a head lamp washer for use in a motor vehicle having a head lamp and a windshield washer for washing a windshield of the motor vehicle. The head lamp washer comprises spray means for spraying washing liquid over a face of the head lamp, the spray means having both a manual mode in which the spray means is operated independently and an automatic mode in which the spray means is operated in cooperation with the windshield washer; a manual mode setting switch for permitting the spray means to assume the manual mode when actuated; an automatic mode setting switch for permitting the spray means to assume the automatic mode when actuated; control means for operating the spray means each time the operations of the windshield washer are counted to a predetermined number under the automatic mode; and liquid spray control means for controlling the amount of washing liquid sprayed from the spray means in such a manner that the amount of washing liquid sprayed under the automatic mode is less than that sprayed under the manual mode.

According to a second aspect of the present invention, there is provided a system in a motor vehicle having a head lamp, a head lamp wiper for wiping the head lamp and a windshield washer for washing a windshield of the motor vehicle. The system comprises a control switch for controlling the windshield washer; a first circuit including an electric power source and a counter, the counter assuming its ON condition when counting up a predetermined number of operations of the control switch for the windshield washer; a first relay which, under the ON condition of the counter, completes the first circuit when the head lamp is energized; a second circuit including an electric power source, manual and automatic mode setting switches which are arranged in parallel, a first electric motor for driving the head lamp wiper and a second electric motor for driving a washing liquid sprayer for the head lamp, the first and second electric motors being arranged in parallel; a second relay which is arranged in the second circuit for completing, under the closed condition of the automatic mode setting switch, the second circuit when the first circuit is completed; and a resistor arranged between the automatic mode setting switch and the second electric motor.

According to a third aspect of the present invention, there is provided a system in a motor vehicle having a head lamp, a head lamp wiper for wiping the head lamp and a windshield washer for washing a windshield of the motor vehicle. The system comprises a control switch for controlling the windshield washer; a first circuit including an electric power source, a counter and a first OFF-delay timer, the counter making its output at High level when counting up a predetermined number of operations of the control switch, the first OFF-delay timer being turned ON when the first circuit is completed; a first relay which, under the High level condition of the output of the counter, completes the first circuit when the head lamp is energized; a second circuit including an electric power source, a second OFF-delay timer, a first electric motor for driving the head lamp wiper and a second electric motor for driving a washing liquid sprayer for the head lamp, the first and second electric motors being arranged in parallel; a work time setter which determines the work times of both the first and second electric motors; a manual mode setting switch incorporated with the first and second circuits and providing, when turned ON, a manual mode condition wherein the first and second electric motors are operated for the predetermined periods of time given by the work time setter; and an automatic mode setting switch incorporated with the first and second circuits and providing, when turned ON, an automatic mode condition wherein when, with the head lamp kept ON, the counter counts up the predetermined number, the first and second electric motors are operated for the predetermined periods of time which are given by the work time setter.

SUMMARY OF THE INVENTION

FIG. 1 is an electric circuit employed in a head lamp washer which is a first embodiment of the present invention;

FIG. 2 (a)–(d) are drawings showing timing charts; and

FIG. 3 is an electric circuit employed in a head lamp washer which is a second embodiment of the present invention.

DETAILED DESCRIPTION OF THE INVENTION

Figure 1:
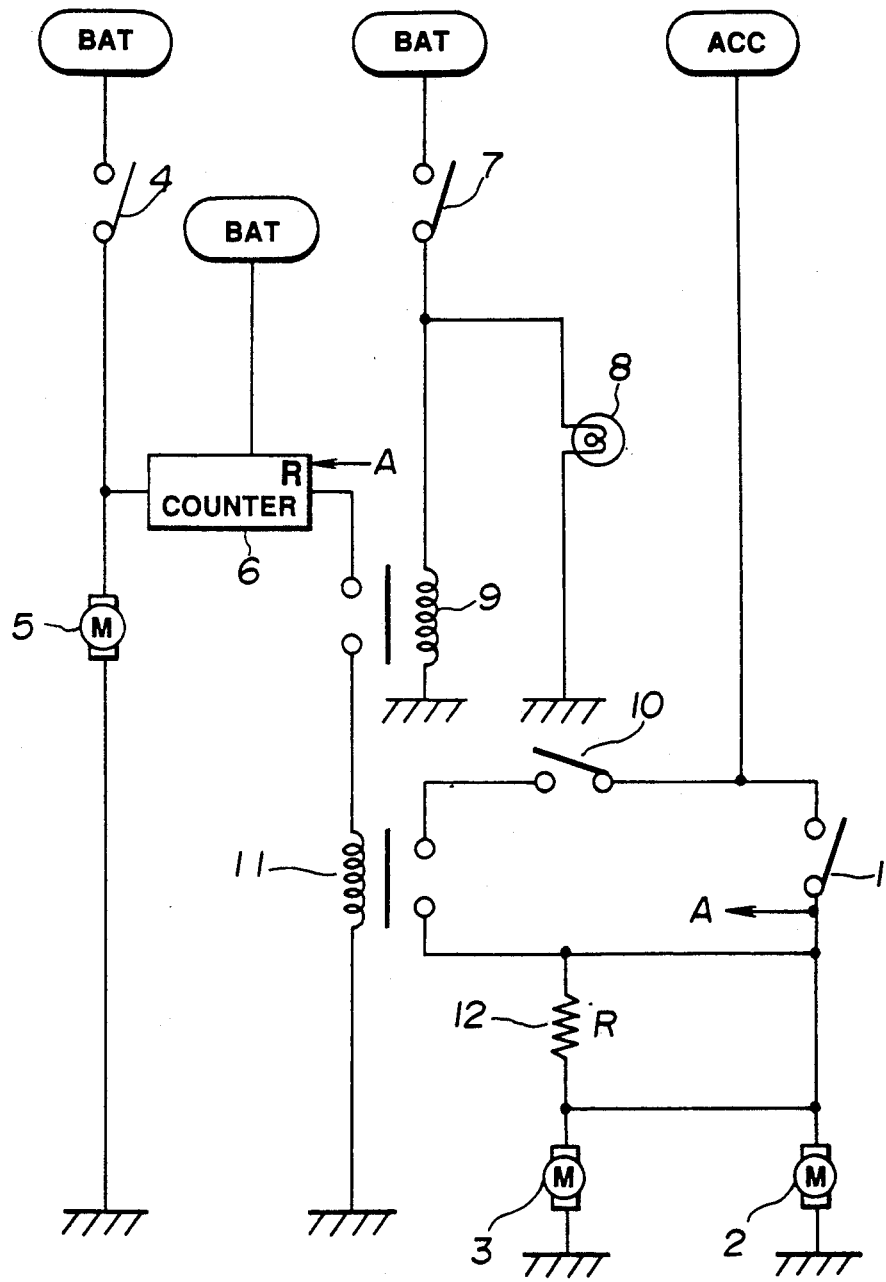
Figure 2A:
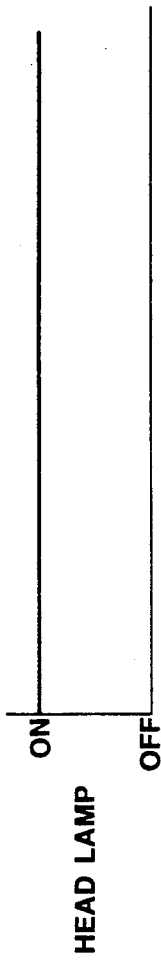
Figure 2B:
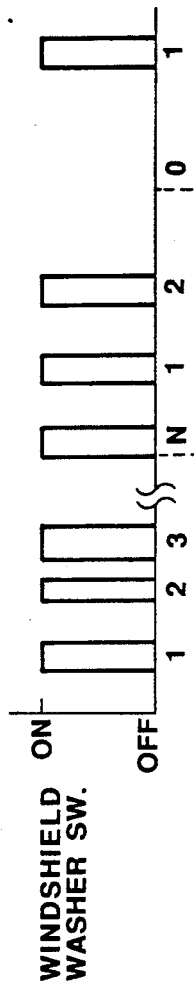
Figure 2C:
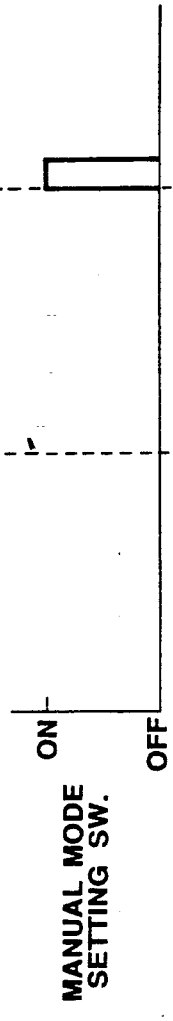
Figure 2D:
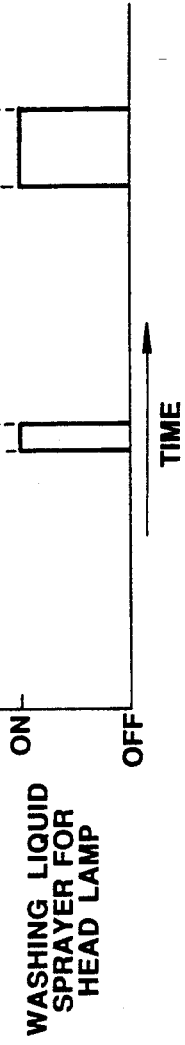

Referring to FIGS. 1 and 2, particularly FIG. 1, there is shown a head lamp washer of a first embodiment of the present invention.

In FIG. 1, an electric circuit of the head lamp washer is illustrated, in which denoted by numeral 1 is a manual mode setting switch of self-reset type. When the manual mode setting switch 1 is turned ON, both an electric motor 2 for a head lamp wiper and an electric motor 3 for a head lamp washer are energized to run. A known measure is applied to the head lamp wiper motor 2, so that when a wiping motion is carried out by five times, the energization of the motor 2 is automatically cancelled. Similar to this, another known measure is applied to the head lamp washer motor 3, so that when the motor 3 effects four revolutions, the energization of the motor 3 is automatically cancelled. The amount of washing liquid sprayed during the four revolutions of the head lamp washer motor 3 is so determined as to sufficiently wash up a face of a head lamp 8.

When a windshield washer switch 4 is turned ON, an electric motor 5 for a windshield washer is energized to run and thus a certain amount of washing liquid is sprayed upon the windshield. A counter 6 is connected to the windshield washer switch 4 to count the operations of the same. That is, when the operations of the switch 4 are counted up to a predetermined number "N" (for example, five), the counter 6 makes its output ON. The ON condition of the output of the counter 6 is automatically cancelled (or reset) when a predetermined time elapses, and the counter 6 is automatically reset upon counting up the predetermined number "N".

It is to be noted that the counter 6 can memorize the up-dated number "n" ($n<N$) even when an ignition switch (not shown) is turned OFF, and that the counter 6 is reset when the manual mode setting switch 1 is turned ON.

When a head lamp switch 7 is turned ON, the head lamp 8 is energized to light and at the same time, a normally open contact of a relay 9 is closed.

Denoted by numeral 10 is an automatic mode setting switch. When the switch 10 is turned ON, operation of an automatic mode is carried out in which the head lamp washer is operated in cooperation with the windshield washer.

When the head lamp switch 7 is kept ON, the head lamp is kept energized keeping emitting of light. This is depicted by the timing chart (a) of FIG. 2.

It is to be noted that counter 6, and the relays 9 and 11 constitute part of a control means, and the resistor 12 constitutes part of a liquid spray control means.

In the following, operation of the first embodiment will be described with reference to FIGS. 1 and 2. For ease of understanding, the description will be commenced with respect to the automatic mode operation.

When, with the automatic mode setting switch 10 and the head lamp switch 7 keeping their ON positions, the operations of the windshield washer switch 4 counted up to the predetermined number "N" (for example, five) as is seen from the timing chart (b) of FIG. 2, the counter 6 makes its output ON. With this, a coil of a relay 11 is energized thereby to close its normally open contact. Upon this, the head lamp washer motor 3 becomes connected to and thus energized by an electric power source ACC through a resistor 12, the closed contact of the relay 11 and the closed automatic mode setting switch 10. Thus, a predetermined amount of washing liquid is sprayed upon the face of the head lamp to wash up the same until the automatic cancellation of energization of the motor 3.

It is to be noted that the power source ACC is an electric power source which becomes operative only when an ignition switch for the engine assumes either one of ON position and Accessary parts energizing position. It is further to be noted that the power source denoted by reference BAT is a source which is constantly connected to a known battery.

Due to provision of the resistor 12, the rotation speed of the motor 3 is controlled, and thus, as is seen from the timing chart of (d) of FIG. 2, the amount of washing liquid sprayed is reduced to about ⅓ of that obtained in an after-described manual mode. The amount of washing liquid sprayed can be varied by changing the resistor 12.

Then, the counter 6 is reset upon expiration of the predetermined time. Thereafter, similar operation, that is, automatic mode operation takes place in a manner as is described hereinabove.

That is, in the automatic mode, when, with the head lamp kept energized, the operations of the windshield washer switch 4 are counted to the predetermined number "N" (for example, five), the head lamp washer motor 3 is energized for a given time to wash up the head lamp.

While, when the manual mode setting switch 1 is turned ON, the head lamp washer motor 3 is energized irrespective of the condition of the automatic mode setting switch 10. This is depicted by the timing chart (c) of FIG. 2. Upon ON turning of the manual mode setting switch 1, the counter 6 is reset.

Under this manual mode, the electric power from the power source ACC is applied to the motor 3 bypassing the resistor 12, and thus, a sufficient amount of washing liquid is sprayed upon the head lamp to sufficiently wash up the same until the automatic cancellation of energization of the motor 3.

Figure 3:
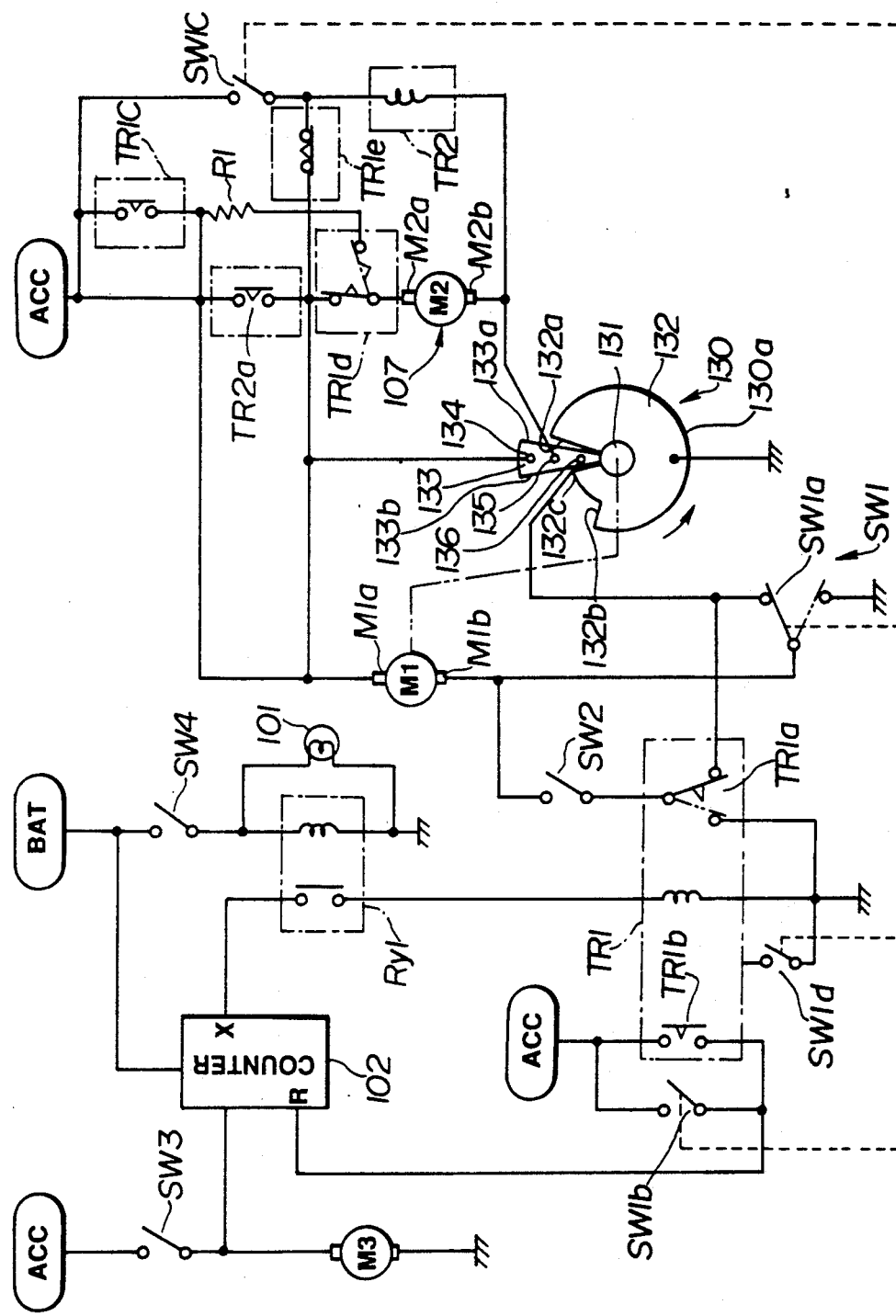

Referring to FIG. 3, there is shown a head lamp washer of a second embodiment of the present invention.

In the drawing, denoted by reference SW1 is a manual mode setting switch of self-reset type, which has four switch elements SW1a, SW1b, SW1c and SW1d which are mutually linked. As will become apparent as the description proceeds, when the switch SW1 is turned ON, a head lamp wiper motor M1 and a head lamp washer motor M2 are operated for given times respectively.

Denoted by reference SW2 is an automatic mode setting switch which, when turned ON, automatically operates the head lamp wiper motor M1 and the head lamp washer motor M2 in an after-mentioned unique manner.

Denoted by reference SW3 is a windshield washer switch which, when turned ON, operates a windshield washer motor M3, and denoted by reference SW4 is a head lamp switch which, when turned ON, energizes a head lamp 101.

A counter 102 is employed for counting the operations of the windshield washer switch SW3. That is, when the operations of the switch SW3 are counted up to a predetermined number "N" (for example, five), the counter 102 makes its output X at High level. The High level condition of the output X is automatically cancelled (or reset) when a predetermined time elapses, and the counter 102 is automatically reset upon counting up the predetermined number "N".

It is to be noted that the counter 102 can memorize the up-dated number "n" (n<N) even when an ignition switch (not shown) is turned OFF.

It is further to be noted that the counter 102 is reset when the manual mode setting switch SW1 is turned ON. That is, when the manual mode setting switch SW1 is turned ON, the electric power from an electric power source ACC is applied through the switch element SW1b to a reset terminal R of the counter 102, and thus the counter 102 becomes reset.

As will be described hereinafter, when, under the automatic mode, an OFF-delay timer TR1 is turned ON, the electric power from the electric power source ACC is applied through a timer contact TR1b to the reset terminal R of the counter 102, and thus the counter 102 becomes reset.

Designated by numeral 130 is a work time setter installed in the head lamp wiper motor M1, which determines the work times of both the head lamp wiper motor M1 and the head lamp washer motor M2.

The work time setter 130 comprises a rotation shaft 131 of insulating material, a larger semicircular contact plate 132 coaxially secured to the rotation shaft 131, a smaller arcuate contact plate 133 coaxially secured to the rotation shaft 131, and three stationary contacts 134, 135 and 136 which are secured to a fixed member (not shown). The rotation shaft 131 and the larger and smaller contact plates 132 and 133 constitute a rotor unit 130a which is rotated by the head lamp wiper motor M1.

The two contact plates 132 and 133 are constructed of electrically conductive material and there are electrically insulated from each other, as is understood from the drawing. In response to revolution of the head lamp wiper motor M1, the rotor unit 130a is rotated in the direction of the arrow.

The smaller arcuate contact plate 133 is so sized and arranged that when assuming the illustrated rest position, the smaller contact plate 133 contacts all of the three stationary contacts 134, 135 and 136. Under this, input terminals M1a and M1b of the head lamp wiper motor M1 are connected through the switch element SW1a of the manual mode setting switch SW1, and at the same time, input terminals M2a and M2b of the head lamp washer motor M2 are connected. The larger semicircular contact plate 132 is earthed and selectively connects and disconnects the two stationary contacts 135 and 136 to and from the ground during rotation of the contact plate 132.

When the rotor unit 130a is rotated in the direction of the arrow from the illustrated rest position to a position where a trailing edge 133a of the smaller contact plate 133 is positioned beyond the three stationary contacts 134, 135 and 136, all of these contacts 134, 135 and 136 are opened.

When, due to further turning, the rotor unit 130a comes to a position where a leading edge 132a of the larger contact plate 132 contacts the two stationary contacts 135 and 136, these stationary contacts 135 and 136 are connected to the ground through the larger contact plate 132. Under this condition, the input terminal M1b of the motor M1 is earthed through the switch element SW1a which then assumes a rest position, and at the same time, the input terminal M2b of the motor M2 is also earthed through the larger contact plate 132.

When then the rotor unit 130a comes to a position where a first trailing edge 132b of the larger contact plate 132 is positioned beyond the stationary contact 135, the contact 135, that is, the input terminal M2b of the motor M2 is disconnected from the earth, and when thereafter the rotor unit 130a comes to a position where a second trailing edge 132c of the larger contact plate 132 is positioned beyond the stationary contact 136, the contact 136, that is, the input terminal M1b of the motor M1 is disconnected from the earth. That is, under this condition, all the stationary contacts 134, 135 and 136 are opened.

When thereafter due to further turning, the rotor unit 130a comes to a position where a leading edge 133b of the smaller contact plate 133 contacts all of the three stationary contacts 134, 135 and 136, the input terminals M1a and M1b of the motor M1 are short-circuited through the stationary contact 134, the smaller contact plate 133, the stationary contact 136 and the switch element SW1a, and at the same time, the input terminals M2a and M2b of the motor M2 are short-circuited through the stationary contact 134, the smaller contact plate 133 and the stationary contact 135. That is, under this condition, the motors M1 and M2 are deenergized and thus they are at a standstill.

Although not shown in the drawings, a speed reduction gear is employed, which is arranged between the head lamp wiper motor M1 and the rotation shaft 131 of the work time setter 130. The reduction gear is so arranged as to turn the rotation shaft 131 once when the head lamp wiper motor M1 effects five revolutions. Furthermore, although not shown in the drawings, a known reciprocating mechanism is employed, which is so arranged as to induce one forward and backward trip of the wiper blade over the face of the head lamp 101 when the head lamp wiper motor M1 effects one revolution. Accordingly, once the head lamp wiper motor M1 is energized, the wiper blade for the head lamp makes five forward and backward trips due to the nature of the work time setter 130.

While, the head lamp washer motor M2 is kept energized for a given time in which the stationary contact 135 contacts the larger contact plate 132 each time the rotor unit 130a rotates. That is, the given time is determined by the circumferential length of the larger contact plate 132 which is defined between the leading edge 132a and the first trailing edge 132b. In the disclosed embodiment, the head lamp washer motor M2 is energized to make four revolutions for each rotation of the rotor unit 130a.

Designated by reference Ry1 is a relay for detecting energization of the head lamp 101. That is, the relay Ry1 becomes ON when the head lamp 101 is energized to light.

Designated by reference TR2 is a so-called "OFF-delay timer" which, when the manual mode setting switch SW1 is turned ON, is instantly turned ON to close a movable contact TR2a. However, when thereafter the manual mode setting switch SW1 is turned OFF, the movable contact TR2a is opened after a predetermined period of time T2 from the OFF turning of the switch SW1.

Designated by reference TR1 is another OFF-delay timer which has five movable contacts TR1a, TR1b, TR1c, TR1d and TR1e. When, with both the automatic mode setting switch SW2 and the relay Ry1 kept ON, the output X of the counter 102 assumes the High level, the OFF-delay timer TR1 is turned ON. However, when thereafter the output X of the counter 102 becomes Low level, the OFF-delay timer TR1 is turned OFF after a predetermined period of time T1 from the time when the output X assumes the Low level.

When, with the manual mode setting switch SW1 kept OFF, the relay TR1 is turned ON, the movable contact TR1a is turned to the position illustrated by a phantom line thereby to energize the head lamp wiper motor M1. Upon the ON turning of the relay TR1, the movable contact TR1c is closed and the movable contact TR1d is turned to a position illustrated by a phantom line, so that the head lamp washer motor M2 is energized by an electric power source ACC through a resistor R1. Furthermore, upon the ON turning of the relay TR1, the normally closed movable contact TR1e installed in the self-holding circuit of the contact TR2a becomes opened. When, then, the predetermined period of time T1 passes, the movable contacts TR1a, TR1b, TR1c, TR1d and TR1e are returned to the positions as shown in FIG. 3.

It is to be noted that the predetermined period of time T1 is the time taken during the time for which the rotor unit 130a of the work time setter 130 makes one revolution. The OFF-delay timer TR1 becomes reset when, upon handling to the manual mode setting switch SW1, the switch element SW1d is closed.

It is to be noted that counter 102, and the relays Ry1, TR1 and TR2 constitute part of a control means, and the resistor R1 constitutes part of a liquid spray control means.

In the following, operation of the second embodiment will be described with reference to FIG. 3 which shows the rest condition of the head lamp washer.

For ease of understanding, the description will be commenced with respect to the manual mode operation.

When, under the rest condition shown in FIG. 3, the manual mode setting switch SW1 is manipulated, the switch element SW1c is closed and at the same time the switch element SW1a is pivoted to the position illustrated by the phantom line. Thus, one input terminal M1a of the head lamp wiper motor M1 is connected to the power source ACC through the normally closed movable contact TR1e and the closed switch element SW1c, and at the same time, the other input terminal M1b of the motor M1 is earthed. As a result, the motor M1 is energized starting the wiping motion of the wiper blade over the face of the head lamp 101. At the same time, the rotor unit 130a of the work time setter 130 starts to rotate in the direction of the arrow, and when the leading edge 132a of the larger contact plate 132 comes to the position where it contacts the two stationary contacts 135 and 136, these two stationary contacts 135 and 136 are earthed. Thus, one terminal of the OFF-delay timer TR2 and the input terminal M2b of the head lamp washer motor M2 are earthed, and thus, the OFF-delay timer TR2 is turned ON closing the normally open contact TR2a and at the same time, the motor M2 is energized.

Even when, under this condition, the manual mode setting switch SW1 is manipulated to return to the original position, the energization of the two motors M1 and M2 is kept by the power supply from the power source ACC through the closed contact TR2a. This is because even when the switch SW1 is returned to the original position, the OFF-delay timer TR2 keeps the self-holding through the normally closed contact TR1e and the input terminals M1b and M2b of the motors M1 and M2 are kept earthed through the stationary contacts 135 and 136 and the larger contact plate 132. Thus, the electric power from the power source ACC is kept applied to the head lamp wiper motor M1 through the closed contact TR2a and the electric power from the power source ACC is kept applied to the head lamp washer motor M2 through the closed contact TR2a and the closed contact TR1d. Thus, the two motors M1 and M2 are kept energized keeping their running.

It is to be noted that because the resistor R1 is inoperative in this condition, the head lamp washer motor M2 rotates at a higher speed causing a head lamp washer 107 to spray a sufficient amount of washing liquid upon the face of the head lamp 101. During this liquid spraying, the wiper blade makes the forward and backward movements over the face of the head lamp 101.

When, due to the continuous operation of the head lamp wiper motor M1, the rotor unit 130a of the work time setter 130 comes to a position where the first trailing edge 132b of the larger contact plate 132 is separated from the stationary contact 135, the earthing of the contact 135 is cancelled. Thus, energization of the head lamp washer motor M2 and that of the OFF-delay timer TR2 are cancelled.

Even after this cancellation, the contact TR2a is kept closed for the predetermined period of time T2 keeping the energization of the head lamp wiper motor M1.

When, thereafter, the leading edge 133b of the smaller contact plate 133 comes to a position where it contacts the stationary contacts 134, 135 and 136, the input terminals M1a and M1b of the head lamp wiper motor M1 are short-circuited causing deenergization of the head lamp wiper motor M1. Upon this, the wiper blade for the head lamp 101 stops at a predetermined rest position. Thereafter, the contact TR2a of the OFF-delay timer TR2 is opened. With this, one cycle of the head lamp washing operation at the manual mode is completed.

Because the manual mode setting switch SW1 is of the self-reset type, the switch SW1 is returned to assume the original condition of FIG. 3 by the end of the above-mentioned washing operation. Of course, when, thereafter, the manual mode setting switch SW1 is manipulated again, identical washing operation takes place.

In the following, the automatic mode operation of the head lamp washer will be described. As will become apparent from the following, the actual operation of the automatic mode is carried out only when the head lamp 101 is kept energized, that is, only when in night.

When, with the head lamp switch SW4 kept closed, the automatic mode setting switch SW2 is closed, the automatic mode operation starts. When thereafter the counter 102 counts the predetermined number "N" (for example, five) of the operations applied to the windshield washer switch SW3 as is seen from the timing chart (b) of FIG. 2, the counter 102 makes its output X at High level. Upon this, the OFF-delay timer TR1 is turned ON because the relay Ry1 has been kept closed due to the continuous energization of the head lamp 101. As a result, the movable contact TR1c is closed thereby connecting the input terminal M1a of the head lamp wiper motor M1 to the power source ACC through the closed contact TR1c, and at the same time, the movable contact TR1a is pivoted to the position as illustrated by a phantom line thereby connecting the other input terminal M1b of the motor M1 to the earth through the closed switch SW2 and the timer contact TR1a. Thus, the electric power is fed from the power source ACC to the head lamp wiper motor M1 to energize the same. Thus, the wiper blade for the head lamp 101 starts to operate.

Due to turning of the motor M1, the rotor unit 130a of the work time setter 130 starts to rotate, and thereafter, similar to the case of the above-mentioned manual mode operation, the input terminal M2b of the head lamp washer motor M2 becomes earthed. Under this condition, the contact TR1c is kept closed and the contact TR1d is kept assuming the position as illustrated by a phantom line, so that the electric power fed from the power source ACC to the head lamp washer motor M2 is controlled by the resistor R1. Thus, the motor M2 is forced to rotate at a speed lower than that at the manual mode operation. Thus, during the forward and backward movements of the head lamp wiper blade, the head lamp washer 107 sprays the washing liquid of about 1/n of that obtained in the above-mentioned manual mode operation.

When, due to the continuous operation of the head lamp wiper motor M1, the rotor unit 130a of the work time setter 130 comes to a position where the first trailing edge 132b of the larger contact plate 132 is separated from the stationary contact 135, the earthing of the contact 135 is cancelled. Thus, energization of the head lamp washer motor M2 is cancelled. When, thereafter, the rotor unit 130a comes to a position where the leading edge 133b of the smaller contact plate 133 contacts the stationary contacts 134, 135 and 136, the input terminals M1a and M1b of the head lamp wiper motor M1 are short-circuited causing deenergization of the head lamp wiper motor M1. Upon this, the wiper blade for the head lamp 101 stops at the predetermined rest position.

That is, when the wiper blade for the head lamp 101 makes five forward and backward trips, the head lamp wiper motor M1 becomes deenergized automatically.

Each time both the motors M1 and M2 are energized, the counter 102 is reset by the timer contact TR1b. Thus, each time the windshield washer switch SW3 is manipulated by the predetermined times "N" (for example, five times), both the motors M1 and M2 are energized for the predetermined period of times to clean the face of the head lamp 101. As is described hereinabove, the amount of the washing liquid consumed in each cycle of the head lamp washing operation at the automatic mode is less than at the manual mode.

When, with the automatic mode setting switch SW2 kept closed and the output of the counter 102 kept at the Low level, the manual mode setting switch SW1 is manipulated, the afore-mentioned manual mode operation is carried out. That is, upon manipulation of the manual mode setting switch SW1, the head lamp wiper motor M1 is instantly energized and then the head lamp washer motor M2 is energized. For the reason as mentioned hereinabove, a sufficient amount of washing liquid is sprayed in this case.

When, with the head lamp washer motor M2 kept energized under the automatic mode, the manual mode setting switch SW1 is manipulated, the OFF-delay timer TR1 is reset through the contact SW1d of the OFF-delay timer TR1, and thereafter, the above-mentioned manual mode operation is carried out causing the head lamp washer 107 to spray a sufficient amount of washing liquid upon the face of the head lamp 101.

As is described hereinabove, the automatic mode operation is actually carried out only when the head lamp 101 is kept energized. More specifically, each time the operations of the windshield washer switch SW3 are counted to the predetermined number "N" (for example, five), the washing liquid is sprayed over the face of the head lamp 101. Furthermore, under the automatic mode, the rotation speed of the head lamp washer motor M2 is controlled to a lower level by the resistor R1, so that the amount of washing liquid sprayed over the head lamp 101 is reduced as compared with that at the manual mode.

Thus, the washing liquid can be saved effectively, unlike the case of the aforementioned conventional head lamp washers.

When the manual mode setting switch SW1 is manipulated, a sufficient amount of washing liquid can be sprayed over the head lamp 101 irrespective of whether the automatic mode is kept set or not. This means that complete cleaning of the face of the head lamp 101 by the sufficient amount of washing liquid is accomplished at need.

What is claimed is:

1. A head lamp washer for use in a motor vehicle having a head lamp and a windshield washer for washing a windshield of the motor vehicle, said head lamp washer comprising:
   spray means for spraying washing liquid over a face of said head lamp, said spray means having both a manual mode in which said spray means is operated independently and an automatic mode in which said spray means is operated in cooperation with said windshield washer;
   a manual mode setting switch for permitting said spray means to assume said manual mode when actuated;
   an automatic mode setting switch for permitting said spray means to assume said automatic mode when actuated;
   control means for operating said spray means each time the operations of said windshield washer are counted to a predetermined number under said automatic mode; and
   liquid spray control means for controlling the amount of washing liquid sprayed from said spray means in such a manner that the amount of washing liquid sprayed under said automatic mode is less than that sprayed under said manual mode.

2. A head lamp washer as claimed in claim 1, in which said control means comprises a counter which counts the operations of a control switch for controlling ON-OFF operation of said windshield washer.

3. A head lamp washer as claimed in claim 2, in which said control means further comprises:
   a first circuit including an electric power source and said counter, said counter assuming its ON condition when counting up said predetermined number;
   a second circuit including an electric power source, said manual and automatic mode setting switches which are arranged in parallel and an electric motor for driving said spray means;
   first relay means which, under the ON condition of said counter, completes said first circuit when said head lamp is energized; and
   second relay means which, under the actuation of said automatic mode setting switch, completes said second circuit when said first circuit is completed.

4. A head lamp washer as claimed in claim 3, in which said liquid spray control means comprises a resistor which is arranged in said second circuit between said automatic mode setting switch and said electric motor.

5. In a motor vehicle having a head lamp, a head lamp wiper for wiping the head lamp and a windshield washer for washing a windshield of the motor vehicle, a system comprising:
- a control switch for controlling said windshield washer;
- a first circuit including an electric power source and a counter, said counter assuming its ON condition when counting up a predetermined number of operations of said control switch for said windshield washer;
- a first relay which, under the ON condition of said counter, completes said first circuit when said head lamp is energized;
- a second circuit including an electric power source, manual and automatic mode setting switches which are arranged in parallel, a first electric motor for driving said head lamp wiper and a second electric motor for driving a washing liquid sprayer for said head lamp, said first and second electric motors being arranged in parallel;
- a second relay which is arranged in said second circuit for completing, under the closed condition of said automatic mode setting switch, said second circuit when said first circuit is completed; and
- a resistor arranged between said automatic mode setting switch and said second electric motor.

6. A system as claimed in claim 5, in which the electric power source of said second circuit is an electric power source which becomes operative only when an ignition switch for an associated engine assumes either one of ON position and Accessary parts energizing position.

7. A system as claimed in claim 6, in which said counter can memorize the up-dated number even when the ignition switch is turned OFF and said counter is reset when said manual mode setting switch is turned ON.

8. In a motor vehicle having a head lamp, a head lamp wiper for wiping the head lamp and a windshield washer for washing a windshield of the motor vehicle, a system comprising:
- a control switch for controlling said windshield washer;
- a first circuit including an electric power source, a counter and a first OFF-delay timer, said counter making its output at High level when counting up a predetermined number of operations of said control switch, said first OFF-delay timer being turned ON when said first circuit is completed;
- a first relay which, under the High level condition of the output of said counter, completes said first circuit when said head lamp is energized;
- a second circuit including an electric power source, a second OFF-delay timer, a first electric motor for driving said head lamp wiper and a second electric motor for driving a washing liquid sprayer for said head lamp, said first and second electric motors being arranged in parallel;
- a work time setter which determines the work times of both said first and second electric motors;
- a manual mode setting switch incorporated with said first and second circuits and providing, when turned ON, a manual mode condition wherein said first and second electric motors are operated for the predetermined periods of time given by said work time setter; and
- an automatic mode setting switch incorporated with said first and second circuits and providing, when turned ON, an automatic mode condition wherein when, with said head lamp kept ON, said counter counts up the predetermined number, said first and second electric motors are operated for the predetermined periods of time which are given by said work time setter.

9. A system as claimed in claim 8, in which said second circuit further includes a resistor which becomes operative when said automatic mode setting switch is turned ON, so that a revolution speed of said second electric motor under the automatic mode condition is lower than that under the manual mode condition.

10. A system as claimed in claim 9, in which said work timer setter is so arranged that the operation time for which said first electric motor operates is longer than the operation time for which said second electric motor operates and that the operation of said second electric motor starts just after the starting of operation of said first electric motor and ends just before the ending of operation of said first electric motor.

11. A system as claimed in claim 10, in which said work time setter comprises:
- a rotation shaft of insulating material which is drive by said first electric motor;
- a larger semicircular contact plate coaxially secured to said rotation shaft;
- a smaller arcuate contact plate coaxially secured to the rotation shaft; and
- three stationary contacts which are secured to a fixed member,
- wherein said larger contact plate is so sized and arranged as to be slidably contactable with two of said three stationary contacts and said smaller contact plate is so sized and arranged as to be slidably contactable with all of said three stationary contacts.

* * * * *